United States Patent Office 2,843,599
Patented July 15, 1958

2,843,599

PROCESS FOR THE PRODUCTION OF PHTHALOCYANINE DYESTUFFS

Berthold Bienert and Fritz Baumann, Leverkusen-Bayerwerk, and Manfred Groll, Köln-Stammheim, Germany, assignors to Farbenfabriken Bayer Aktiengesellschaft, Leverkusen, Germany, a corporation of Germany No Drawing. Application September 26, 1955
Serial No. 536,784

Claims priority, application Germany September 28, 1954

9 Claims. (Cl. 260—314.5)

This invention relates to a process for the production of phthalocyanine dyestuffs.

It is known that chrome dyes of the phthalocyanine series can be obtained if phthalocyanine sulfochlorides are reacted with aminosalicylic acid (see co-pending application Serial No. 209,374, filed by Hans Hoyer, Otto Bayer and Fritz Nadler on May 21, 1938, now Patent 2,300,572).

It is an object of the present invention to provide novel chrome dyes of the phthalocyanine series. A further object is to provide chrome dyes which dye fabrics very uniformly. Other objects will appear hereinafter.

These objects are attained in accordance with the present invention by using as chrome dyes dyestuffs which can be obtained of phthalocyanine sulfochlorides are reacted with aminoalkyl aminosalicylic acid derivatives of the general formula

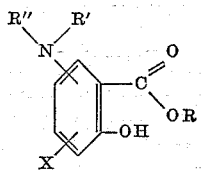

in which X represents hydrogen or a sulfo group, R hydrogen, a monovalent metal, alkyl, cycloalkyl, aryl or aralkyl, R' hydrogen or alkyl, and R" an alkyl group, which may be substituted by a primary or secondary amino group and, in the case where R' is hydrogen, even by a tertiary amino group.

The phthalocyanine sulfochlorides containing the central atoms usually employed, for example cobalt, nickel or copper are suitable for the present process. The sulfochloride groups may be either directly on the benzene ring in the 3-position or 4-position or on a side chain. They are introduced into the phthalocyanine molecule according to known methods, for example with chlorosulfonic acid.

The aminoalkyl aminosalicylic acid used for the process according to the invention are obtained, for example by reacting aromatic amino-o-hydroxycarboxylic acids with the corresponding halogen alkyl amines. In order that the final products should be sufficiently soluble, it is advisable to use aromatic amino-o-hydroxycarboxylic acids which contain sulfo groups. Examples of such compounds are 5-β-aminoethylamino-2-hydroxy-3-sulfobenzoic acid and 5-β-aminoethyl-methylamino-2-hydroxy-3-sulfobenzoic acid.

The aminoalkyl-amino-o-hydroxycarboxylic acids can be used in the form of their salts or esters for the reaction with the phthalocyanine sulfochlorides.

The reaction of the aforementioned aminoalkyl aminosalicylic acids with the phthalocyanine sulfochlorides takes place very readily and most easily in water. In order to fix the acid being liberated, acid-fixing substances, for example caustic soda solution or sodium bicarbonate are preferably added. It is possible to convert all, or if desired only a part of the sulfochloride groups into the corresponding amides.

If the solubility of the phthalocyanine dyestuffs obtained is not satisfactory, it can be improved by a subsequent after-sulfonation, for example with chlorosulfonic acid.

The phthalocyanine dyestuffs which can be obtained by the process according to the invention are characterized by their clear color shade, their very good lightfastness properties and their excellent dyeing properties. They are taken up as chrome dyes. The colors of the finally dyed or printed fabrics are very uniform, very fast to rubbing and are often fast to finishing operations.

The present invention is further illustrated by the following examples without, in any way, limiting it. The parts given are by weight if not otherwise stated.

Example 1

15.3 parts of 100% (=31.7 parts of 48.3%) sodium salt of copper-phthalocyanine-4,4',4'',4'''-tetrasulfonic acid (from the sodium salt of 4-sulfophthalic acid) are introduced slowly while stirring into 165 parts of chlorosulfonic acid and heated to 60–70° C. At this temperature, 25.8 parts of pure thionyl chloride are added dropwise and the mixture is then heated for about 5 to 6 hours at 90° C. After cooling, the reaction mixture is mixed by stirring with iced water, the precipitated copperphthalocyanine-(4)-tetrasulfochloride is filtered off and washed neutral with iced water. The neutral paste of the sulfochloride is stirred with a small amount of iced water and introduced while stirring into a solution of 8.6 parts of 5-β-amino-ethylamino-2-hydroxy-3-sulfobenzoic acid and 5.45 parts of 45% caustic soda solution in 50 parts of water. After stirring for 2 to 3 hours, another 13.85 parts of 45% caustic soda solution are added. The mixture is thereafter stirred for 12 hours at room temperature, and is then heated for 1 hour at 60° C., 1000 parts of water are added and filtration carried out while hot with active carbon.

After the filtrate has been acidified with HCl, the dyestuff is salted out with common salt and separated in the usual manner. A good yield of a clear turquoise blue chrome dye is obtained.

If the equivalent amount of 5-β-aminoethyl-methylamino-2-hydroxy-3-sulfobenzoic acid is used instead of 5-β-aminoethylamino-2-hydroxy-3-sulfobenzoic acid, a dyestuff with similar properties is obtained.

The 5-β-aminoethylamino-2-hydroxy-3-sulfobenzoic acid can be obtained as follows:

233 parts of 5-amino-2-hydroxy-3-sulfobenzoic acid are dissolved in 1400 parts of water and 178 parts of a 45% sodium hydroxide solution, the reaction vessel being filled with nitrogen. Thereafter, 118 parts of 1-amino-2-chloroethane hydrochloride are added and 266 parts of 45% sodium hydroxide are dropped slowly into this mixture at 20° C. Thereafter the reaction mixture is stirred for about 12 hours at room temperature and then 1 to 2 hours at 60° C. Upon acidifying the mixture with hydrochloric acid (pH$_1$) it is stirred for some time while cooling. The precipitated unreacted 5-amino-2-hydroxy-3-sulfonic benzoic acid is sucked off and washed 2 to 3 times with iced water. The filtrate is brought to a pH of about 5 to 6 and saturated with sodium chloride. The precipitated 5-β-aminoethylamino-2-hydroxy-3-sulfobenzoic acid is filtered off and recrystallized from a small amount of water. The acid obtained is easily soluble in water. Therefore it is advantageously not isolated but used as aqueous solution for further reactions.

In a similar manner 5-β-aminoethyl-methylamino-2-hydroxy-3-sulfobenzoic acid can be obtained by the following procedure:

310.5 parts of 5-methylamino-2-hydroxy-3-sulfobenzoic acid are dissolved in 1760 parts of water by adding 223 parts of a 45% sodium hydroxide solution. Then 148.5 parts of 1-amino-2-chloroethane hydrochloride are added and 335 parts of a 45% sodium hydroxide solution slowly dropped in at a temperature of 20° C. The pulpy mass obtained is diluted with 1250 parts of water and then stirred for 12 hours at room temperature and 1 to 2 hours at 60° C. The reaction mixture is thereafter made acid (pH=1) by adding hydrochloric acid and the non-reacted 5-methylamino-2-hydroxy-3-sulfobenzoic acid filtered off in the cold and the residue washed with a small amount of icy water. The 5-β-aminoethyl-methyl-amino-2-hydroxy-3-sulfobenzoic acid is obtained by neutralizing the filtrate with sodium hydroxide solution and saturating the mixture with sodium chloride. Upon sucking off, the acid is recrystallized from 530 parts of water. The acid thus obtained contains only small amounts of a compound containing more nitrogen, presumably 5-β'-aminoethyl-β-aminoethyl-methylamino-2-hydyroxy-3-sulfobenzoic acid.

Other salicylic acid derivatives can be obtained by starting from other halogen alkyl amines, for example 1-chloro-2-diethylamino-ethane, etc.

*Example 2*

22.62 parts of copper-phthalocyanine are heated for 2 hours at 140° C. in 226 parts of chlorosulfonic acid. 15 parts of thionyl chloride are slowly run into the solution when it has cooled to 80° C. and the temperature is then maintained at 90–95° C. until a sample is insoluble in diethylamine solution. The reaction mixture is stirred while cold into ice, the precipitated sulfochloride is filtered off and washed neutral with iced water. The neutral paste is divided into two equal portions:

(a) The first portion of the sulfochloride is introduced into a cold solution of 8.6 parts of 5-β-aminoethylamino-2-hydroxy-3-sulfobenzoic acid and 5.54 parts of 45% caustic soda solution in 50 parts of water. Another 13.85 parts of 45% caustic soda solution are added and the mixture is worked up as described under (b) below.

(b) The other portion of the sulfochloride is mixed by stirring with a cold solution of 15.4 parts of 5-β-aminoethylamino-2-hydroxy-3-sulfobenzoic acid and 9.9 parts of 45% caustic soda solution in 50 parts of water. After adding another 5.54 parts of 45% caustic soda solution, the mixture is stirred for a further 12 hours at room temperature and for one hour at 60° C. The chrome dyes formed in good yield as described under (a) and (b) above are salted out with common salt and separated in the usual manner.

*Example 3*

6 parts of nickel-phthalocyanine are heated for 4 to 5 hours at 112 to 113° C. in 60 parts of chlorosulfonic acid, cooled to 70 to 75° C. and, after adding 7.25 parts of thionyl chloride, heated for approximately another 2 hours at 90–95° C. until a sample is insoluble in diethylamine solution. After cooling, the reaction mixture is mixed by stirring with ice, the precipitated sulfochloride is filtered with suction and washed neutral with iced water. The sulfochloride paste is introduced into a solution of 3.78 parts of 5-β-aminoethylamino-2-hydroxy-3-sulfobenzoic acid and 2.76 parts of 45% caustic soda solution in 30 parts of water. The mixture is then stirred for 3 to 4 hours while adding 5.2 parts of 45% caustic soda solution and for a further 12 hours at room temperature. After heating for 1 hour at 60° C., the dyestuff formed is precipitated by being stirred into a solution of hydrochloric acid and common salt and recovered by filtration. It constitutes a valuable, clear, greenish-blue chrome dye.

*Example 4*

22.6 parts of 4,4'-diphenyl-copper-phthalocyanine, prepared from 2 mols of 3,4-dicyandiphenyl and 2 mols of phthalodinitrile are heated for 2 hours at 140° C. in 226 parts of chlorosulfonic acid. The mixture is then allowed to cool to 80° C. and 15 parts of thionyl chloride are slowly run in at this temperature. The mixture is then heated to 90 to 95° C. until a sample is insoluble in diethylamine solution. The reaction mixture is stirred while cold into ice, the precipitated sulfochloride is filtered with suction, washed neutral with iced water and divided into two portions.

One half of the sulfochloride paste is introduced into a solution of:

(a) 8.69 parts of β-aminoethylamino-sulfosalicylic acid, and 5.54 parts of a 45% caustic soda solution in 50 parts of water, and the other half introduced into a solution of (b) 15.4 parts of β-aminoethylamino-sulfosalicylic acid, and 9.90 parts of 45% caustic soda solution in 50 parts of water.

After the sulfochloride paste has been added, each of these mixtures is stirred for about 1 hour, and then another 13.85 parts of 45% caustic soda solution are slowly added dropwise to solution (a) and 5.54 parts of 45% caustic soda solution are similarly added to solution (b).

After stirring for 12 hours at room temperature, the mixture in each case is heated for 1 hour at 60° C. The dyestuff formed is salted out with common salt, filtered with suction and if necessary dried. In each case a clear bluish-green chrome dye is obtained in good yield.

Dyes having a somewhat more yellowish shade are obtained if 27.36 parts of 4,4',4'',4'''-tetraphenyl-copper-phthalocyanine are converted into the tetrasulfochloride by reaction with 274 parts of chlorosulfonic acid and 15 parts of thionyl chloride at ordinary temperature and further processed as indicated above. Particularly valuable chrome dyes are obtained from 4,4'-diphenyl-copper-phthalocyanine-4'',4'''-disulfonic acid.

*Example 5*

50 parts of a copper-phthalocyanine containing sulfo groups in the 4-position dissolved in 540 parts of chlorosulfonic acid are reacted with 78 parts of thionyl chloride by heating for 6 hours at 90 to 95° C. to obtain the sulfochloride. The reaction mixture is poured onto ice and the precipitate filtered off and washed neutral with ice water.

The sulfochloride thus obtained is mixed with a small amount of iced water and then reacted with 38.2 parts of the disodium salt of 5-β-diethylamino-ethylamino-2-hydroxy-3-sulfobenzoic acid which has been made bicarbonate alkaline by stirring with about 11.5 parts of a 37% hydrochloric acid and 9.35 parts of sodium bicarbonate. Thereafter further 29.1 parts of sodium bicarbonate are introduced and the mixture is then stirred for 10 to 12 hours at room temperature. Upon heating for 1 hour at 60° C., the dyestuff formed is salted out with common salt, filtered off and washed with sodium chloride solution. A clear turquoise chrome dye is obtained which does not turn to green when treated with diluted acids.

The 5 - β - diethylamino-ethylamino-2-hydroxy-3-sulfobenzoic acid can be obtained as follows:

255 parts of the sodium salt of 5-amino-2-hydroxy-3-sulfobenzoic acid are dissolved in 510 parts of water and 485 parts of a 33% sodium hydroxide solution, the reaction vessel being filled with nitrogen. 172 parts of diethylamino-chloroethane hydrochloride dissolved in 350 parts of water are slowly dropped into this mixture within 4 to 5 hours at 55 to 60° C. while stirring. Thereafter, the reaction mixture is stirred for another 2 hours at 55° to 60° C. and then 12 hours at room temperature. Upon addition of 91 parts of sodium chloride, 197 parts of a 37% solution of hydrochloric acid are added to obtain a pH of 5 to 6. The reaction mixture is then stirred for some time while being kept ice cold. The precipitate is sucked off and washed twice with iced sodium chloride solution. The residue is then dispersed with about 1500 parts of a 5% sodium chloride solution and hydrochloric acid is added until a strong Congo-acid reaction is obtained. The undissolved 5-amino-2-hydroxy-3-sulfobenzoic acid is filtered off and the 5-β-diethyl-amino-ethylamino-2-hydroxy-3-sulfobenzoic acid obtained from the filtrate by adding sodium chloride, while the solution being at a pH of 8 to 8.5. The 5-β-diethyl-amino-ethylamino-2-hydroxy-3-sulfobenzoic acid is easily soluble in water and therefore preferably not isolated but used as aqueous solution for further reactions.

In contrast to the 5-amino-2-hydroxy-3-sulfobenzoic acid respectively 5-methylamino-2-hydroxy-3-sulfobenzoic acid, the reaction products of these acids with chloroethylamine, respectively diethylamino-chloroethane are easily soluble in hydrochloric acid containing sodium chloride.

Example 6

37.8 parts of a copper-phthalocyanine dissolved in 340 parts of chlorosulfonic acid are heated for 4 to 5 hours to 112° to 113° C. until a sample is soluble in a 10% pyridine/water mixture. Thereafter, 24 parts of thionylchloride are dropped in at 60 to 70° C. The mixture is then heated to 90 to 95° C. until a worked up sample is insoluble in diethyl amine/water.

The sulfochloride formed is then poured onto ice and used in the same manner as described in Example 5. Thus, a greenish-blue chrome dye is obtained.

Example 7

30 parts of the sodium salt of 4-phenyl-copper-phthalocyanine-4',4'',4'''-trisulfonic acid, obtained from 3,4-dicyanodiphenyl and the sodium salt of 4-sulfophthalic acid by a urea melt as easily soluble compound, are slowly introduced into 300 parts of chlorosulfonic acid. Thereafter, 16.4 parts of thionyl chloride are dropped in while stirring, the stirring being continued for 5 to 6 hours at 75 to 80° C. until a worked up sample is insoluble in diethylamino/water. The reaction mixture is poured onto ice, the precipitated sulfochloride sucked off and washed neutral with icy water.

To the sulfochloride which is mixed with a small amount of icy water, an aqueous solution containing 18.3 parts of the disodium salt of 5-β-diethylamino-ethyl-amino-2-hydroxy-3-sulfobenzoic acid which has been made triazene neutral, are added. The 26.55 parts of a 33% sodium hydroxide solution, diluted with 265 parts of water, are slowly dropped in while stirring. The reaction mixture is stirred for about 10 to 12 hours and then neutralized with acetic acid. Upon adding common salt, a clear bluish-green dyestuff is obtained which can be purified by dissolving in 1500 parts of water which contain 25 parts of glacial acetic acid and salting out again by adding 250 parts of common salt.

We claim:

1. The reaction product of a member selected from the group consisting of a heavy metal-containing phthalocyanine sulfochloride and the phenyl-substituted derivatives thereof with compounds of the general formula

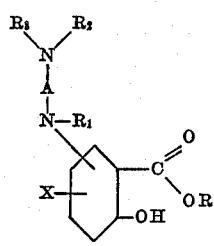

wherein X represents a member selected from the group consisting of hydrogen and a sulfonic acid group, R is a member selected from the group consisting of hydrogen, a monovalent metal, lower alkyl, cycloalkyl and phenyl, A is a lower alkylene radical and $R_1$, $R_2$ and $R_3$ are selected from the group consisting of hydrogen and lower alkyl, at least one of which is hydrogen.

2. As novel dyestuff the reaction product of copper-phthalocyanine-4-tetrasulfochloride with a compound represented by the formula

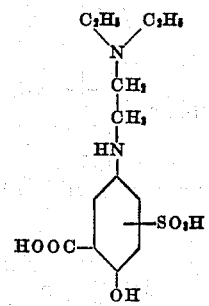

3. As novel dyestuff the reaction product of copper-phthalocyanine-3-trisulfochloride with a compound of the general formula

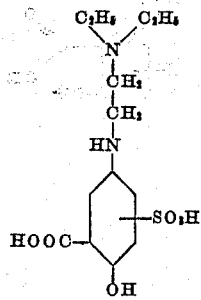

4. As novel dyestuff the reaction product of nickel phthalocyanine-4-tetra-sulfochloride with a compound of the general formula

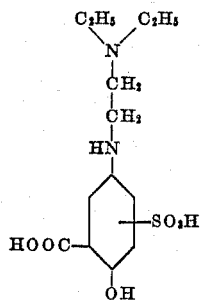

5. As novel dyestuff the reaction product of nickel phthalocyanine-3-trisulfochloride with a compound of the general formula

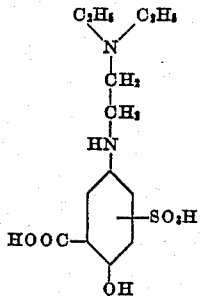

6. As novel dyestuff the reaction product of 4-phenyl-copper-phthalocyanine-4-trisulfochloride with a compound of the general formula

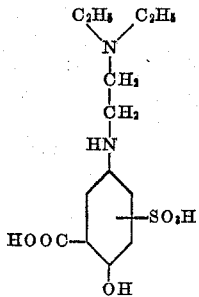

7. A process for the production of dyestuffs of the phthalocyanine series which comprises contacting a member selected from the group consisting of a heavy metal-containing phthalocyanine sulfochloride and the phenyl-substituted derivatives thereof with a compound of the general formula

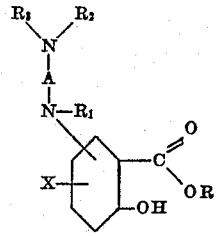

wherein X represents a member selected from the group consisting of hydrogen and a sulfonic acid group, R is a member selected from the group consisting of hydrogen, a monovalent metal, lower alkyl, cycloalkyl and phenyl, A is a lower alkylene radical and $R_1$, $R_2$ and $R_3$ are selected from the group consisting of hydrogen and lower alkyl, at least one of which is hydrogen.

8. The process of claim 7 wherein $R_1$ is hydrogen.

9. The process of claim 8 wherein X is a sulfonic acid group.

References Cited in the file of this patent
UNITED STATES PATENTS

| | | |
|---|---|---|
| 2,459,771 | Fox | Jan. 18, 1949 |
| 2,479,491 | Haddock et al | Aug. 16, 1949 |
| 2,493,724 | Mayhew | Jan. 3, 1950 |
| 2,706,199 | Brentano | Apr. 12, 1955 |

FOREIGN PATENTS

| | | |
|---|---|---|
| 1,072,608 | France | Mar. 17, 1954 |
| 713,397 | Great Britain | Aug. 11, 1954 |